United States Patent
Kim et al.

(10) Patent No.: US 6,788,358 B1
(45) Date of Patent: Sep. 7, 2004

(54) LIGHT UNIT IN LIQUID CRYSTAL DISPLAY

(75) Inventors: Je Hong Kim, Goyang (KR); Seung Chul Lee, Ahnyang (KR)

(73) Assignee: LG. Philips LCD Co., Ltd., Seoul (KR)

(*) Notice: Subject to any disclaimer, the term of this patent is extended or adjusted under 35 U.S.C. 154(b) by 29 days.

(21) Appl. No.: 09/680,277

(22) Filed: Oct. 6, 2000

(30) Foreign Application Priority Data

Oct. 8, 1999 (KR) ........................................ 1999-43553

(51) Int. Cl.[7] ............................................ G02F 1/1335
(52) U.S. Cl. .......................................... 349/62; 349/67
(58) Field of Search ...................... 349/61–71; 362/31; 361/31

(56) References Cited

U.S. PATENT DOCUMENTS

| | | | |
|---|---|---|---|
| 4,989,956 A | * | 2/1991 | Wu et al. ...................... 349/71 |
| 5,390,085 A | * | 2/1995 | Mari-Roca et al. ............ 362/31 |
| 5,477,423 A | * | 12/1995 | Fredriksz et al. .............. 362/31 |
| 5,673,128 A | * | 9/1997 | Ohta et al. ..................... 349/62 |
| 5,808,708 A | * | 9/1998 | Oyama et al. ................. 349/65 |
| 5,808,713 A | * | 9/1998 | Broer et al. ................... 349/98 |
| 6,151,169 A | * | 11/2000 | Kim ........................... 359/640 |
| 6,295,104 B1 | * | 9/2001 | Egawa et al. ................. 349/63 |
| 6,317,177 B1 | * | 11/2001 | Matsushita et al. ........... 349/65 |

FOREIGN PATENT DOCUMENTS

DE    0067892 A1 *  6/1981  ............. F21V/7/04

* cited by examiner

Primary Examiner—Dung T. Nguyen
Assistant Examiner—Timothy Rude
(74) Attorney, Agent, or Firm—Birch, Stewart, Kolasch & Birch, LLP

(57) ABSTRACT

A back light configured to have a high focusing ability is disclosed. In the unit, a light directs a light path of a light beam to the rear side thereof to obtain high focusing of the light beam. A light guide plate allows the light beam from the light input to progress in the vertical direction of a liquid crystal panel.

19 Claims, 8 Drawing Sheets

LIGHT UNIT IN LIQUID CRYSTAL DISPLAY

BACKGROUND OF THE INVENTION

1. Field of the Invention

This invention relates to a liquid crystal display, and more particularly to a light unit in the liquid crystal display that has a high focusing ability.

2. Description of the Related Art

Generally, a liquid crystal display (LCD) controls a transmitted amount of light beams supplied from a back light unit by means of a liquid crystal panel consisting of a number of liquid crystal cells arranged in a matrix type and a number of control switches for switching video signals to be applied to the liquid crystal cells, thereby displaying a desired picture on a screen. The back light unit will be described with reference to FIG. 1 and FIG. 2 below.

Figure 1:
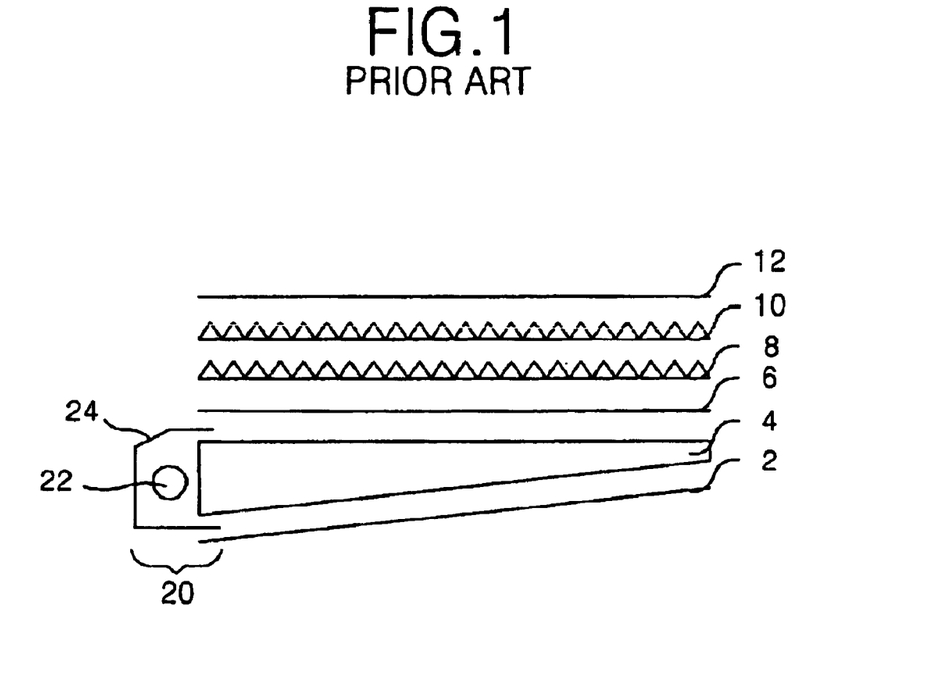
FIG. 1 is a section view showing a configuration of a conventional back light unit.

Referring to FIG. 1, the conventional back light unit includes a light-guide plate 4 for guiding light beams passing through a light input 20, a reflective plate 2 arranged under the light-guide plate 4 to reflect light beams progressing toward the lower surface and the side surface of the light-guide plate 4 into the upper surface thereof, a first diffusion sheet 6 for diffusing light beams passing through the light-guide plate 4, first and second prism sheets 8 and 10 for controlling a progress direction of light beams passing through the first diffusion sheet 6, and a second diffusion sheet 12 for diffusing light beams passing through the prism sheets 8 and 10. The light input 20 consists of a lamp 22 for generating light beams, and a lamp housing 24 for packaging the lamp 22 and reflecting the light beams from the lamp 22 into the light-guide plate 4. The lower surface of the light-guide plate 4 is provided with a printed pattern. This printed pattern does not meet a total reflection condition of the light beams passing through the light input 20, thereby allowing the light beams to be uniformly progressed into the upper surface of the light-guide plate 4. At this time, the light beams progressing toward the lower surface and the side surface of the light-guide plate 4 are reflected by the reflective plate 2 to be progressed into the upper surface thereof. The light beams passing through the light-guide plate 4 are diffused into the entire area by means of the first diffusion sheet 6. The light beams incident to a liquid crystal panel (not shown) have a large light efficiency at right angles. To this end, it is desirable that two forward prism sheets are disposed to make a progress angle of the light beams outputted from the light-guide plate 4 perpendicular to the liquid crystal panel. As shown in FIG. 1, the light beams passing through the first and second prism sheets 8 and 10 are incident to the liquid crystal panel via the second diffusion sheet 12. The conventional back light unit having the configuration as described above cannot obtain a desired view angle profile until two prism sheets are included. Accordingly, it has problems in that light loss does not only increase, but also a manufacturing costs rise. A structure that has been suggested for the purpose of solving the above-mentioned problems is shown in FIG. 2.

Figure 2:
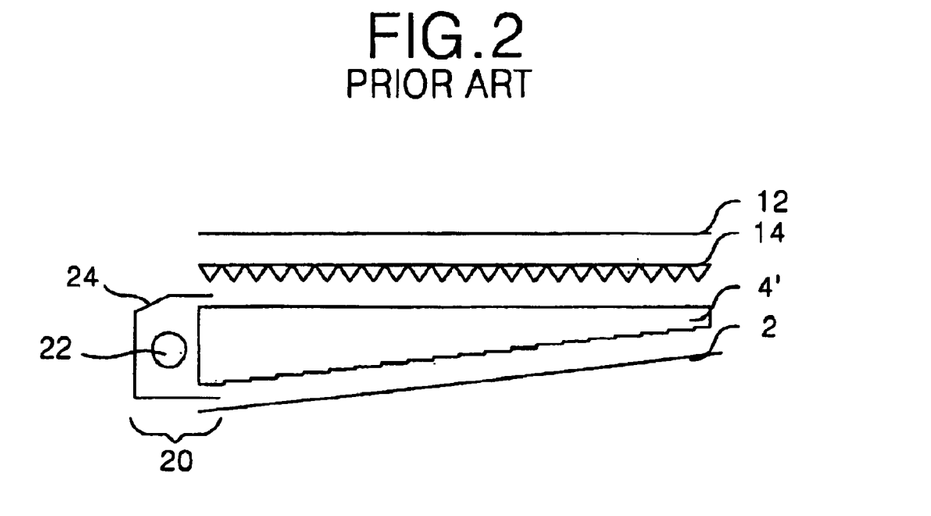
FIG. 2 is a section view showing a configuration of another conventional back light unit.

Referring now to FIG. 2, the conventional back light unit includes a light-guide plate 4' for guiding light beams passing through a light input 20, a reflective plate 2 arranged under the light-guide plate 4' to reflect light beams progressing toward the lower surface and the side surface of the light-guide plate 4' into the upper surface thereof, a prism sheet 14 for controlling a progress direction of the light beams passing through the light-guide plate 4', and a diffusion sheet 12 for diffusing light beams passing through the prism sheet 14. Since the light input 20 and the reflective plate 2 have the same function and operation as those in FIG. 1, an explanation as to them will be omitted. The lower surface of the light-guide plate 4' is provided with a prism-shaped pattern. This prism-shaped pattern does not meet a total reflection condition of the light beams passing through the light input 20, thereby allowing the light beams to be uniformly progressed into the upper surface of the light-guide plate 4'. A backward prism sheet 14 is arranged over the light-guide plate 4'. In this case, it is desirable that, since an angle of the light beams outputted from the light-guide plate 4' is more than about 65°, vertical angles of the prism sheet 14 should maintain 63° to 70°. Thus, the light beams passing through the prism sheet 14 make right angles with respect to the liquid crystal panel. The light beams passing through the prism sheet 14 are diffused into the entire area by means of the diffusion sheet 12. The conventional back light unit having the configuration as described above has problems in that, since the backward prism sheet 14 is included, the wall surface of the light-guide plate 4' not only get reflected, but also bright lines of the light input 20 are seen. Therefore, it is necessary to provide a back light unit with a high focusing ability that is capable of reducing the manufacturing cost as well as minimizing the wall surface reflection and the bright lines of the light input.

SUMMARY OF THE INVENTION

Accordingly, it is an object of the present invention to provide a light unit in a liquid crystal display that has a high focusing ability.

In order to achieve these and other objects of the invention, a light unit in a liquid crystal display according to the present invention includes a light input for directing a light path of a light beam to the rear side thereof to obtain high focusing of the light beam. The present light unit further includes a light guide for allowing the light beam from the light input to progress in the vertical direction of a liquid crystal panel.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 3:
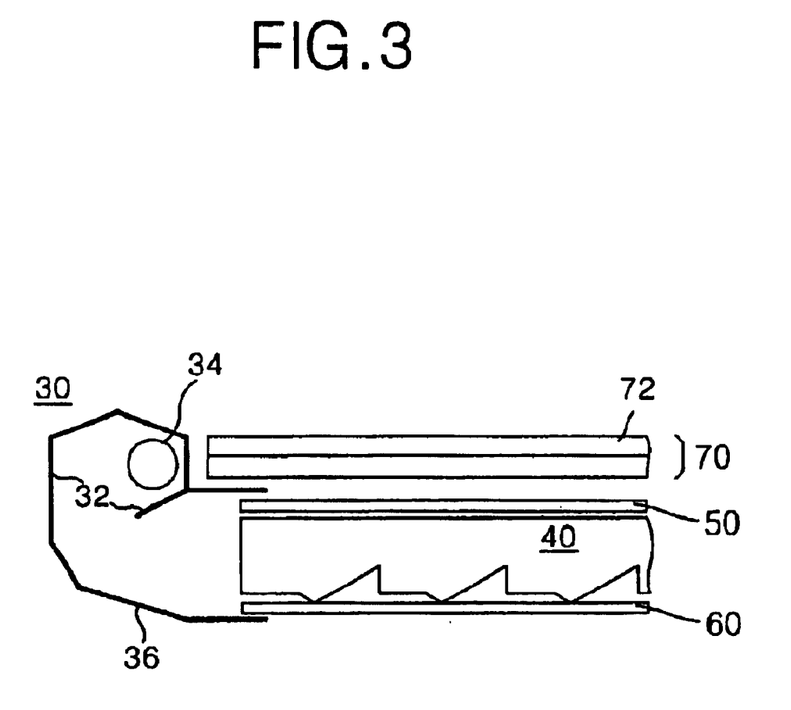
FIG. 3 is a section view showing the configuration of a back light unit according to an embodiment of the present invention.

Referring to FIG. 3, there is shown a back light unit according to an embodiment of the present invention. The back light unit includes a light input 30 directing a light path of a light beam into the rear side thereof to achieve high focusing of the light beam, and a light-guide plate 40 for progressing the light beam from the light input 30 in the vertical direction, of a liquid crystal panel. The light input 30 directs a light path of a light beam into the rear side to narrow a range of an incidence angle in the vertical direction of a light beam incident to the light-guide plate 40, thereby achieving high focusing of the light beam. A reflective plate 60 is additionally installed below the light-guide plate 40 and reflects a light beam progressing downwardly from the light guide plate 40 toward the liquid crystal panel.

This will be described below in conjunction with FIG. 4 and FIG. 5.

Figure 4:
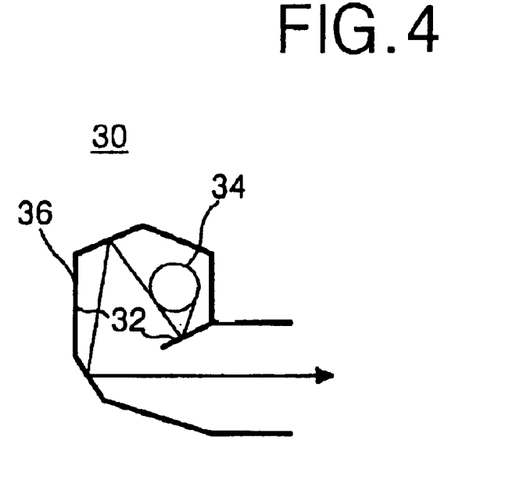
FIG. 4 is a section view showing a structure of the light input in FIG. 3.

Referring to FIG. 4, the light input 30 includes a lamp 34 for generating a light beam, and a lamp housing 36 having a reflective plate 32 formed at one side thereof to direct a light path of a light beam generated from the lamp 34 into the rear side thereof. In order to obtain high focusing, the lamp 34 provided at the light input 30 is arranged such that a position of the lamp 34 is not in line with that of the light-guide plate. To this end, it is desirable that the lamp 34 has a higher or lower level than the light-guide plate 40. In this case, even though the lamp 34 has a higher or lower level than the light-guide plate 40, the liquid crystal display is unchanged in its entire thickness.

Figure 5:
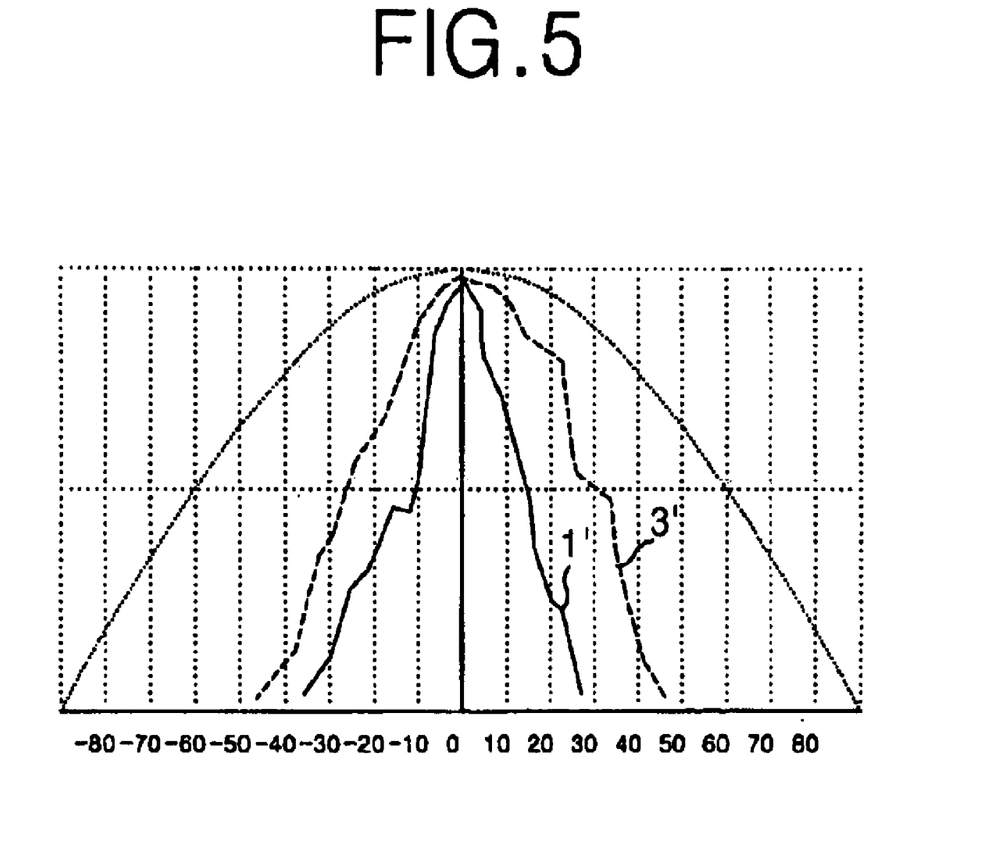
FIG. 5 is a graph showing a light direction distribution at the light input in FIG. 3.

By the light input 30 having the structure as mentioned above, a light beam incident to the light-guide plate 40 is high-focused in such a manner that a vertical incidence angle is within a range of ±20° to 30° as indicated by a curve 1' in FIG. 5. In this case, the vertical incidence angle range of a light beam at the light incident surface is defined in response to an installation angle of the reflective plate 32 integral to the lamp housing 36. The lamp housing 36 may be formed to have a sectional view of spiral shape for the purpose of achieving an effective reflection. On the other hand, a horizontal incidence angle of a light beam at the incident surface has a relatively wide distribution as indicated by a curve 3' in FIG. 5. Hereinafter, the light-guide plate 40 will be described in conjunction with FIG. 6 and FIG. 8.

Figure 6:
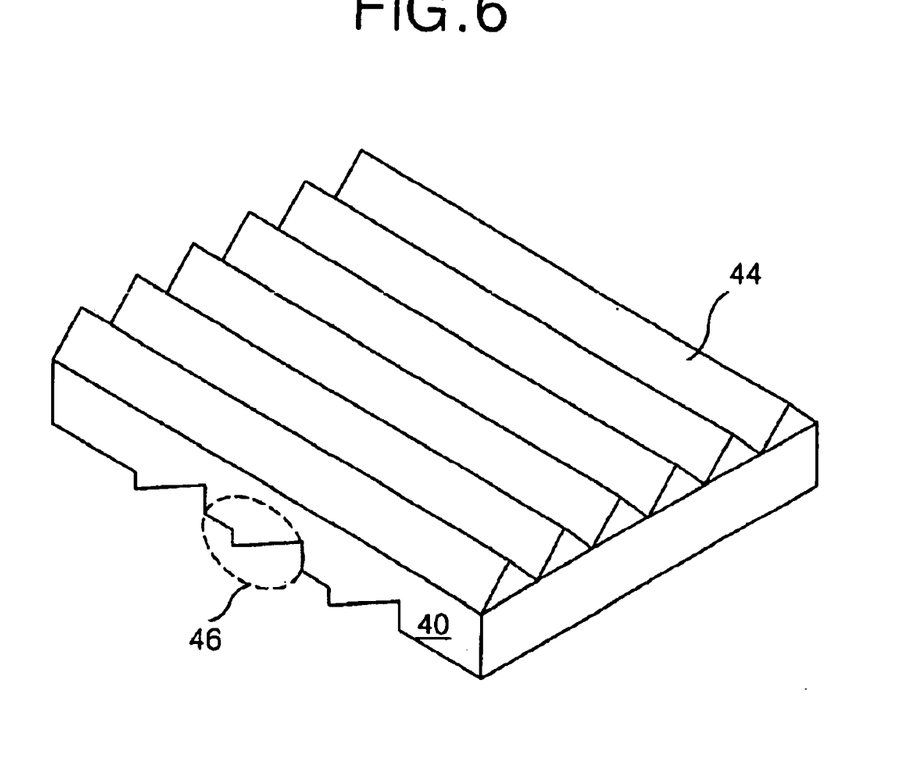
FIG. 6 is a perspective view showing a structure of the light-guide plate in FIG. 3.
Figure 7:
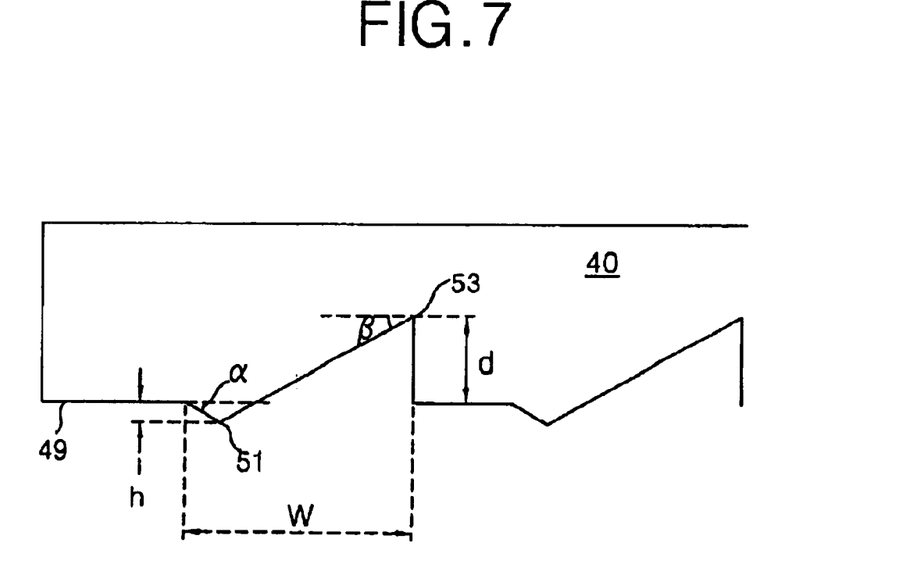
FIG. 7 is a section view showing a structure of the light-guide plate in FIG. 3.

Referring to FIG. 6, the present light-guide plate 40 includes a lower surface 49 provided with a plurality of unit patterns 46 for progressing a light beam from the light input 30 in a direction perpendicular to the liquid crystal panel, and prism patterns 44 formed on an upper surface to be perpendicular to the unit patterns 46. The unit patterns 46 is formed on the lower surface of the light-guide plate 40 to progress a light beam perpendicularly. To this end, a light path at the inner side of the light-guide plate 40 is configured to fail to meet a full reflection condition. As shown in FIG. 7, each of the unit patterns 46 consists of a land 51 protruded at a desired incline from the lower surface 49, and a groove 53 extended from the land 51 to have a desired incline. In this case, the land 51 has a triangular shape protruded by a desired height h from the lower surface 49 and the groove 53 has a right-angled triangle etched away by a desired depth d from the lower surface 49. It is desirable that a between angle $\alpha$ between the lower surface 49 and the land 51 is set to a range of 9 to 12° while a between angle $\beta$ between the lower surface 49 and the groove 53 is set to a range of 37 to 45°. Also, a width w of the unit pattern 46 is set to 100 to 400 $\mu$m and a depth d of the groove 53 is set to about three to five times more than a height h of the land 51 so as to improve light efficiency. A distance between the unit patterns 46 is controlled so as to assure uniformity of a light beam. For instance, it is desirable that a distance between the unit patterns 46 at an area close to a lamp is set widely (e.g., to hundreds of $\mu$m) while a distance between the unit patterns 46 is set more narrowly (e.g., to tens of $\mu$m) as a distance between the unit patterns 46 and the lamp increases.

Figure 8:
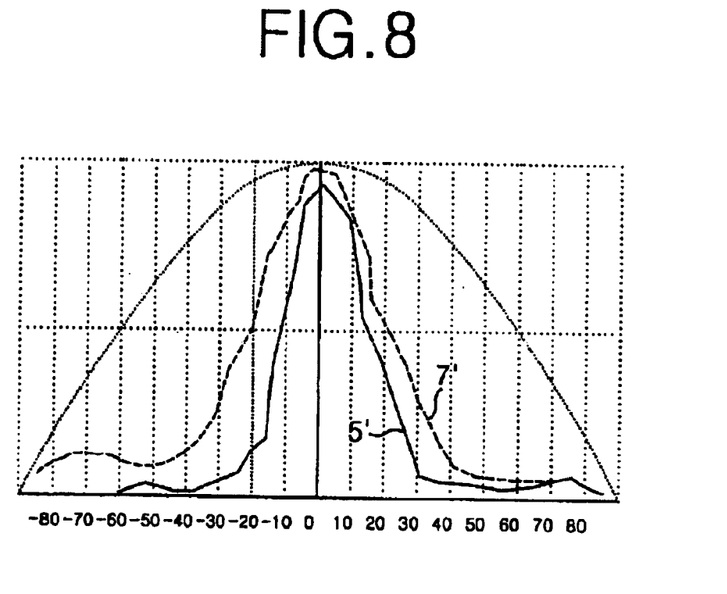
FIG. 8 is a graph showing a light direction distribution of a light beam outputted from the light-guide plate in FIG. 3.

Since the upper surface of the light-guide plate 40 is provided with a lamp and the vertical prism patterns 44 such that a horizontal incidence angle of a light beam at the incident surface meets a range as indicated by a curve 7' in FIG. 8, a light beam is more focused in the horizontal direction in comparison to the prior art. At this time, a vertical angle of each prism pattern 44 can be set to have various values from an acute angle until an obtuse angle in accordance with a focusing degree of a light beam requested by a designer. In this case, a horizontal incidence angle of a light beam is controlled by the light input 30, so that a high focusing as indicated by a curve 5' in FIG. 8 becomes possible. Since no prism sheet is required when the light-guide plate 40 having the structure as mentioned above is used, a light loss caused by the prism sheet can be prevented. In other words, the light efficiency can be improved.

Furthermore, it is possible to prevent a pattern shape appearance at the lower surface of the light-guide plate 40 by utilizing a hologram film or a diffusion sheet 50. Particularly, the hologram film 50 is applicable to a display employing a cholesteric liquid crystal (CLC) color filter. More specifically, in a display employing the CLC color filter, the hologram film 50 is provided at the interior of the liquid crystal panel 70 to widen a narrow view angle distribution caused by focusing. In this case, the hologram film 50 may be formed by coating a hologram pattern on the lower portion of the upper substrate 72. Since the pattern of the lower surface of the light-guide plate 40 has a sufficient distance from the hologram film 50, a pattern shape of the lower surface of the light-guide plate 40 is not viewed by a user and an interference (or moire) phenomenon between the light-guide plate and the display electrode also is prevented. Also, although the existent back light unit takes a wedge shape in which a thickness of the light input is different from that of the lamp in the opposite direction, the present back light unit has a thickness of the light input equal to that of the end thereof, so that it can be implement with a thickness as small as possible within an ejection range.

Figure 9:
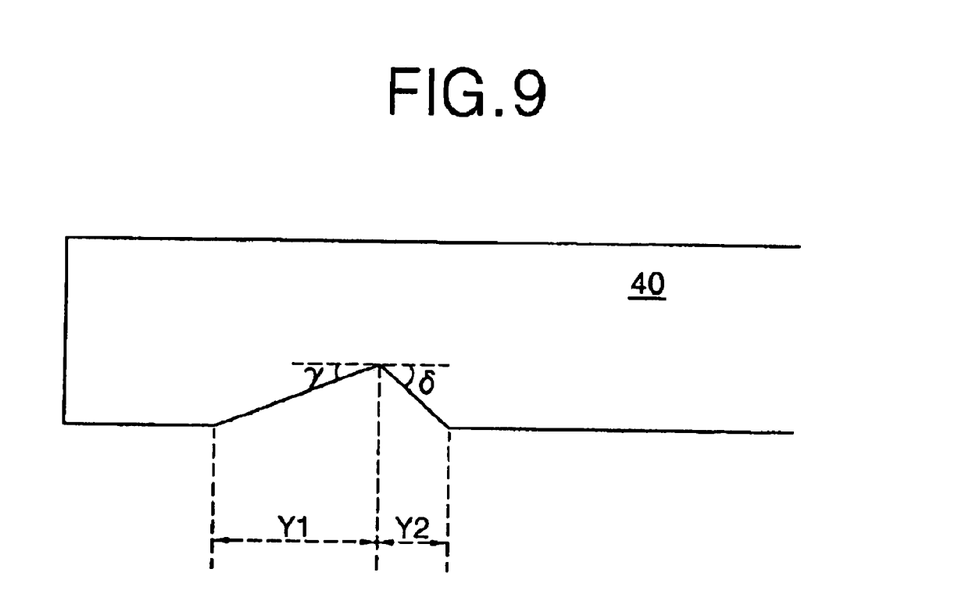
FIG. 9 is a perspective view showing another example of the light-guide plate in FIG. 3.

Alternately, since the unit pattern of the light-guide plate shown in FIG. 6 has a very high processing difficulty and may have an adverse affect on a required, characteristic due to a processing error generated upon processing thereof, it may be formed to have a structure as shown in FIG. 9 in consideration of a processing property of the light-guide plate. In this case, it is desirable that $\gamma$ is set to a range of 40° to 50° and $\delta$ is set to a range of 40° to 90°. Also, Y1 and Y2 changes depending on a size of the light-guide plate. In other words, a width of the unit pattern is differentiated so as to assure uniformity of light beam. For instance, when the light-guide plate has a size of 4 inches, it is possible to assure light beam uniformity even though the Y1 and Y2 have a large value of hundreds of μm. But, it is desirable that, when the light-guide plate has a size of more than 14 inches, the Y1 and Y2 have a small value within tens of μm.

As described above, the back light unit according to an embodiment of the present invention can obtain a horizontal view angle distribution without a prism sheet at the upper portion of the light-guide plate, so that it does not have light loss caused by the prism sheet to be applicable to a display requiring a high brightness.

Figure 10:
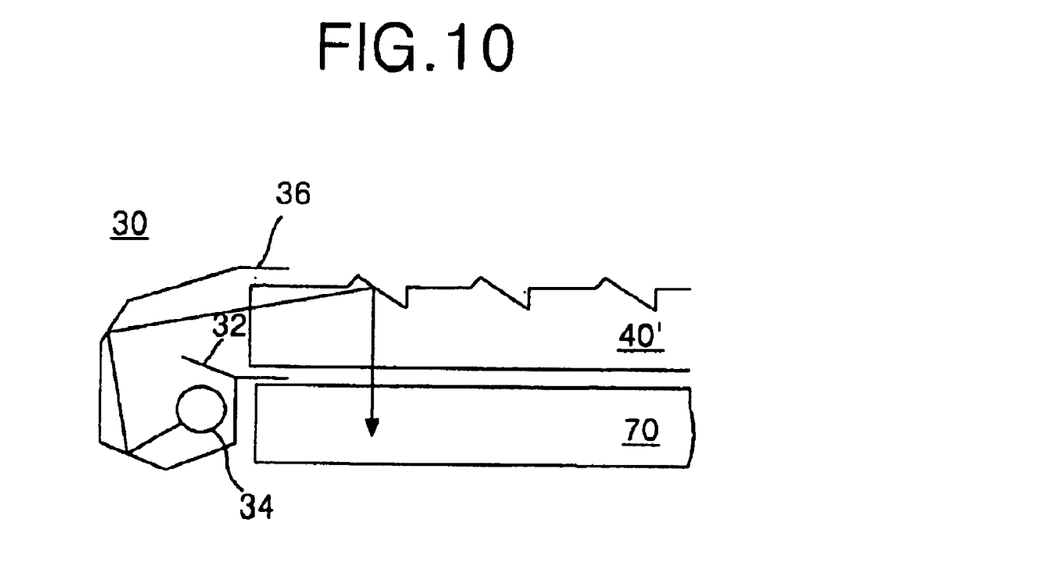
FIG. 10 is a section view showing a structure of a front light unit according to another embodiment of the present invention.
Figure 11:
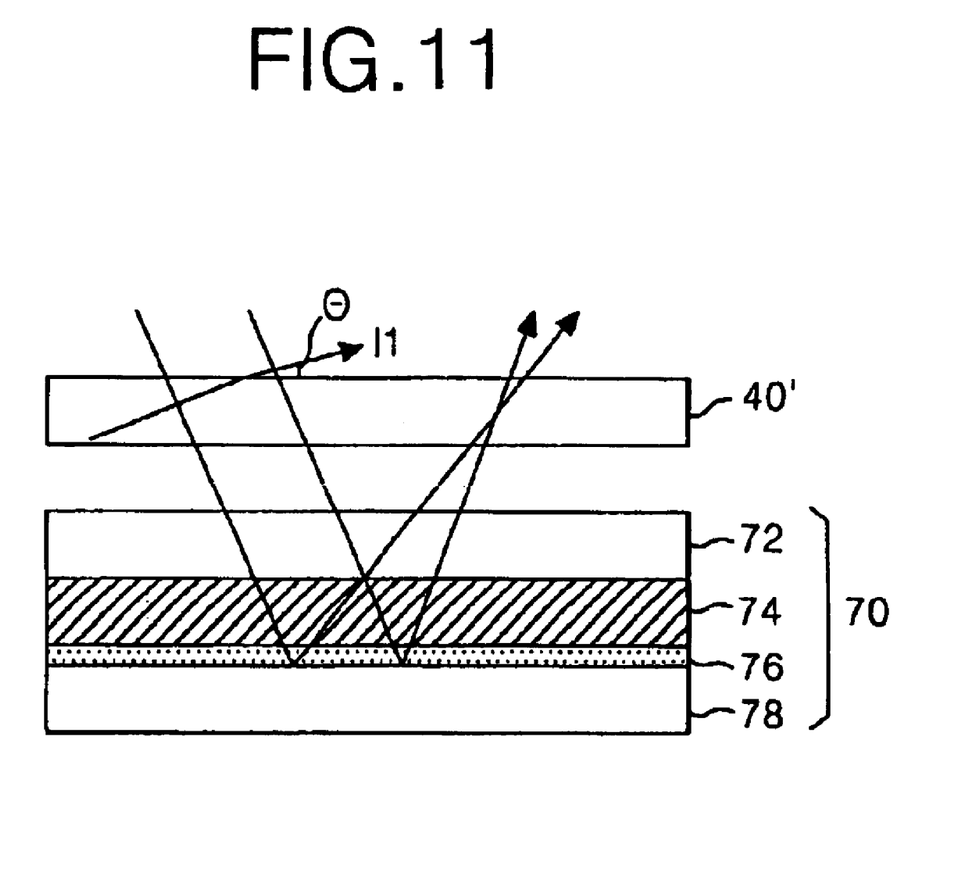
FIG. 11 is a view for explaining a requirement of; a reflective liquid crystal display device in FIG. 10.

Hereinafter, another embodiment of the present invention will be described with reference to FIG. 10 through FIG. 14. Referring to FIG. 10, the back light unit, which is applied to the reflective LCD, includes a light input 30' directing a light path of a light beam into the rear side thereof to achieve high focusing of the light beam, and a light-guide plate 40' for progressing the light beam from the light input 30' in the vertical direction of a liquid crystal panel. As mentioned above, a light input 30' includes a lamp 34', and a lamp housing 36' having a reflective plate 32' opposed to the lamp 34'. As shown in FIG. 11, a reflective LCD exclusively uses an external light unlike a transmissive LCD. Also, when an intensity of illumination is low, the reflective LCD generates a light beam using the light unit to obtain a clear picture in a dark environment. Such a reflective LCD is referred to as "front light unit" because a light unit is arranged at the front side of a liquid crystal. This front light unit will be described below. In addition, several required characteristics to be considered upon design of the reflective LCD will be described.

First, a light beam L1 emitted from the light input 30' and progressing directly to a user must be minimized. If it is difficult to minimize the light beam L1, it is desirable to adjust a progressing angle θ of the light beam L1 such that the light beam L1 departs from a viewing angle of a user. Second, an amount of an output light progressing into the liquid crystal panel all over the entire area of a light-guide plate 40' must have an almost uniform distribution. To this end, minute patterns are provided on one surface of the light-guide plate 40'. Third, a light beam outputted from the light input 30' into a reflective liquid crystal panel 70 must be close upon the vertical direction. When an angle of a light beam outputted to the reflective liquid crystal panel 70 makes a right angle, maximum light efficiency is obtained. In other words, as a light beam incident to the liquid crystal panel gets closer in the vertical direction, an incidence efficiency of the reflective liquid crystal panel 70 is increased. Fourth, when an external light is used, an adverse effect caused by the light input 30' must be minimized. The light-guide plate 40' operates only when peripheral light is dark, and displays a picture using peripheral light in all other cases. Accordingly, it is desirable to design the reflective liquid crystal panel 70 such that a distortion in a surface reflection and an incidence angle, etc. of the peripheral light is not caused by the light input 30'.

Referring to FIG. 11, light-guide plate 40' is disposed on the reflective liquid crystal display. At this time, light guide plate 40' and light input 30' are configured to meet a condition as indicated in FIG. 11. The light input 30' must have focused light distribution in such a manner that a light beam is incident vertically to the liquid crystal panel 70. To this end, a lamp 34' is arranged at a higher or lower level than the light-guide plate 40'. Also, a reflective plate 32' is provided at one side of the lamp housing to direct a light path of a light beam generated from the lamp 34' into the rear side thereof.

Figure 13:
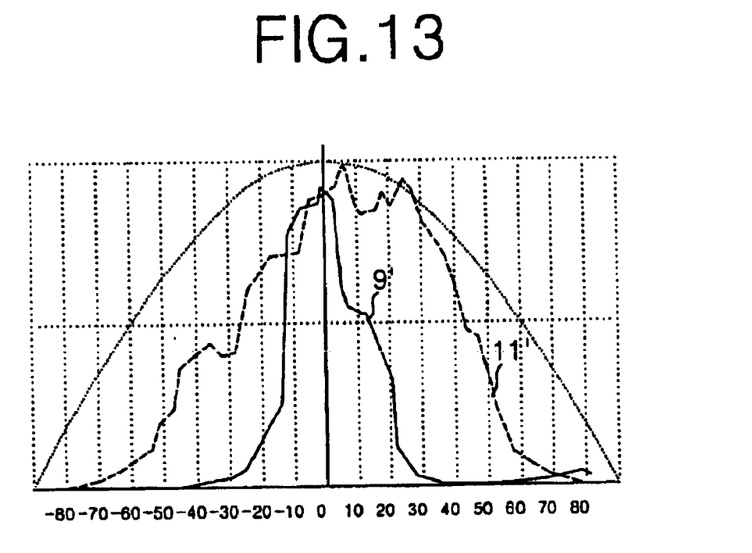
FIG. 13 is a graph showing a light direction distribution of a light beam progressing from the light-guide plate into the liquid crystal panel in FIG. 10.

By the light input 30' having the structure as mentioned above, a light beam incident to the light-guide plate 40' is high-focused in such a manner that a vertical incidence angle is within a range of ±20° to 30° as indicated by a curve 9' in FIG. 13. In this case, the vertical incidence angle range of a light beam at the light incident surface is defined in response to an installation angle of the reflective plate 32' integral to the lamp housing 36'. The lamp housing 36' may be formed to have a desired curvature for the purpose of achieving an effective reflection.

Figure 12:
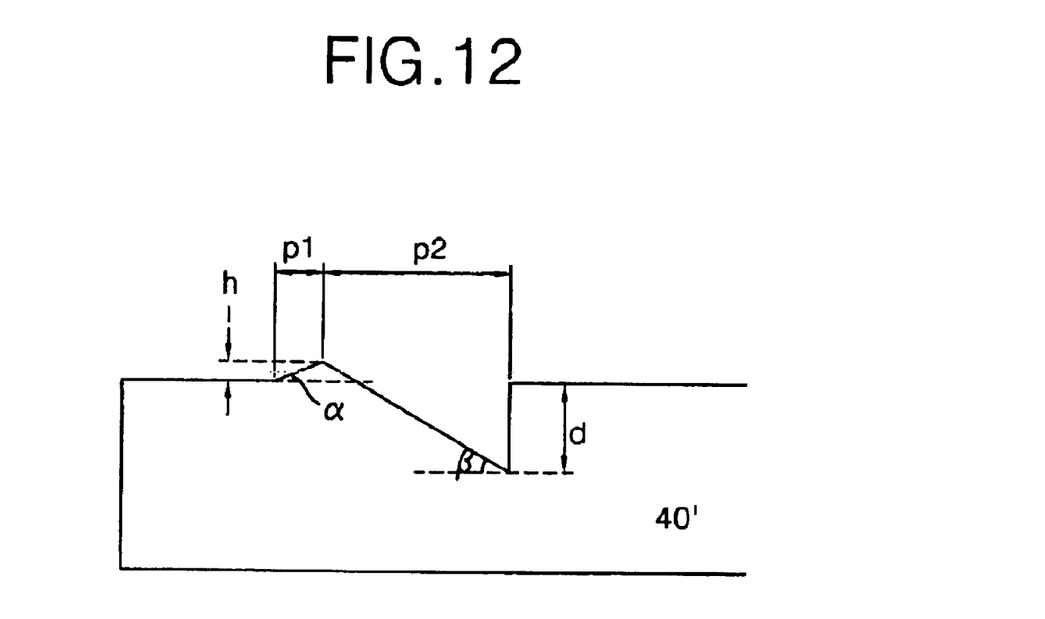
FIG. 12 is a section view showing a structure of the light-guide plate in FIG. 10.

Hereinafter, the light-guide plate 40' will be described in conjunction with FIG. 12. Since a shape and a between angle of the unit pattern 46' provided on the light-guide plate 40' as shown in FIG. 12 has been sufficiently described earlier with reference to FIG. 7, a detailed explanation as to them will be omitted. In this case, it is desirable that a angle between the lower surface and the groove is set to a range of 35 to 45° at the unit pattern 46' of the light input plate 40'. Also, it is desirable that a width w of the unit pattern 46' is set to a value as small as possible so as to improve a visibility of a user. Especially, a length of p1 in width w of the unit pattern 46' is kept within 200 μm to prevent an interference phenomenon between the light-guide plate 40' and the LCD electrode. Since the upper surface of the light-guide plate 40' is not provided with a prism pattern at the other surface opposed to one surface having a unit pattern, a horizontal incidence angle of an incident light is not focused. Accordingly, a horizontal light distribution of an incident light has a distribution as indicated by a curve 11' in FIG. 13.

Figure 14:
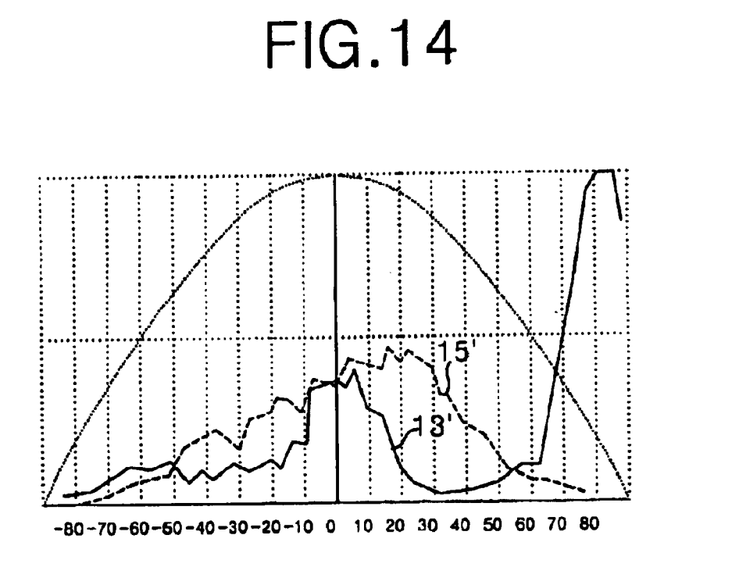
FIG. 14 is a graph showing a light direction distribution of a light beam progressing from the light-guide plate into a user in FIG. 10.

FIG. 14 represents vertical and horizontal incidence angles of a light beam progressing toward a user in a light beam incident to the light-guide plate 40'. In FIG. 14, a curve 13' represents a vertical light distribution of an incidence angle, and a curve 15' represent a horizontal light distribution of an incidence angle. In this case, a light amount progressing toward a user is kept within 15% of a light amount progressing into the liquid crystal panel 70.

Such a light amount is much smaller than that in the conventional front light. In other words, a light amount progressing into the liquid crystal panel is increased to realize a high brightness.

As described above, the present back light unit has an advantage in that it can be configured to obtain a high focusing ability and applied to a back light unit of transmissive liquid crystal display and a front light unit of a reflective liquid crystal display.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A back light unit in a liquid crystal display, comprising:
   a light guide plate; and
   a light input device for directing light substantially to a rear side of said light input device in a direction away from the light guide plate prior to directing said light to a front side thereof and toward the light guide plate to obtain high focusing of said light, wherein substantially all of said light is directed through a substantially non-solid medium, prior to being directed toward said light guide plate.

2. The backlight unit according to claim 1, wherein said light guide plate allows the light from the light input device to progress in the vertical direction of a liquid crystal panel.

3. The backlight unit according to claim 2, wherein the light input device includes:
   a lamp for generating light; and
   a lamp housing having a reflective plate provided at an inner side thereof to direct a light path of the light beam generated from the lamp into the rear side thereof before directing the light beam toward the light guide plate.

4. The back light unit according to claim 3, wherein the reflective plate is formed to have a sectional view of spiral shape.

5. The back light unit according to claim 3, wherein the reflective plate is curved to obtain a desired vertical incident angle of the light progressing to the light-guide plate.

6. The back light unit according to claim 3, wherein the reflective plate is curved to have about ±20° to 30° in a vertical incident angle of the light progressing to the light-guide plate.

7. The back light unit according to claim 3, wherein the lamp housing includes at least one reflective plate for cutting off the light progressing directly from the lamp into the light-guide plate, the at least one reflective plate being protruded from the inner surface of the lamp housing.

8. The back light unit according to claim 3, wherein the light-guide plate includes a plurality of unit patterns formed on one side thereof in parallel with the lamp, the plurality of unit patterns allowing the light from the lamp housing to be progressed perpendicularly into the liquid crystal panel.

9. The back light unit according to claim 8, wherein the unit pattern includes:
   a land protruded at a desired incline from one surface of the light-guide plate; and
   a groove extended from the land to have a desired incline.

10. The back light unit according to claim 9, wherein an angle between the one surface of the light-guide plate and the land is about 9° to 12°, an angle between the one surface of the light-guide plate and the groove is about 35° to 45°, wherein the groove has a height of about 3 to 5 times relative to the land, and the unit pattern is about 100 to 400 $\mu$m in width.

11. The back light unit according to claim 8, wherein the unit pattern includes a groove having a sectional view of triangular shape.

12. The back light unit according to claim 11, wherein an angle between one surface of the light-guide plate and one surface of the groove is about 40° to 50°, and an angle between one surface of the light-guide plate and another surface of the groove is about 30° to 90°.

13. The back light unit according to claim 11, wherein the light-guide plate is disposed at the rear side of a transmissive liquid crystal panel, and the lamp housing directs the light from the lamp to the incident side of the light-guide plate disposed at the rear side of the transmissive liquid crystal panel.

14. The back light unit according to claim 13, further comprising a rear reflective plate for reflecting the light from the rear surface of the light-guide plate toward the transmissive liquid crystal panel.

15. The back light unit according to claim 14, wherein the light-guide plate includes a plurality of prism patterns arranged on another surface thereof in intersection with the unit patterns.

16. The back light unit according to claim 8, wherein the light-guide plate is disposed at the front side of a transmissive liquid crystal panel and the lamp housing directs the light from the lamp to the incident side of the light-guide plate disposed at the front side of the transmissive liquid panel.

17. The back light unit according to claim 16, wherein a distance between the start point and the angular point of the land is within 200 $\mu$m.

18. The back light unit according to claim 8, wherein a distance between the unit patterns get gradually shorter as said unit patterns get further away from the incident side of the light-guide plate.

19. A back light unit in a liquid crystal display comprising:
   a light guide plate; and
   a light input device for directing a light path from a light source toward the light-guide plate, wherein the light from the light source is passed through the light input device to be incident into the light-guide plate without being incident directly to the light-guide plate.

* * * * *